United States Patent [19]

Wolpert

[11] 4,331,715
[45] May 25, 1982

[54] PROCESS FOR IMPROVING THE CORROSION RESISTANCE OF CONVERSION COATED PARTS

[75] Inventor: Stephen M. Wolpert, Detroit, Mich.

[73] Assignee: Hooker Chemicals & Plastics Corp., Warren, Mich.

[21] Appl. No.: 222,185

[22] Filed: Jan. 2, 1981

[51] Int. Cl.³ .............................................. B05D 3/02
[52] U.S. Cl. .............................. 427/240; 148/6.15 Z; 427/327; 427/334; 427/379; 427/386; 523/200; 523/456; 523/462; 523/402
[58] Field of Search ............... 260/29.2 EP; 528/114; 427/240, 334, 379, 327, 386; 428/4.57

[56] References Cited

U.S. PATENT DOCUMENTS

| 4,094,844 | 6/1978 | Allen et al. | 260/29.3 |
| 4,098,744 | 7/1978 | Allen et al. | 260/29.4 R |
| 4,119,609 | 10/1978 | Allen et al. | 528/114 |
| 4,256,811 | 3/1981 | Black | 427/334 |

Primary Examiner—Theodore E. Pertilla
Attorney, Agent, or Firm—Richard P. Mueller; Arthur E. Kluegel

[57] ABSTRACT

An aqueous based coating composition comprises a flow control agent, a water solubilized epoxy adduct of an epoxy compound and an amino-substituted aromatic carboxylic acid, and a curing agent. The coating composition is applied to conversion coated steel parts to provide an improved corrosion resistant organic coating thereon.

12 Claims, No Drawings

PROCESS FOR IMPROVING THE CORROSION RESISTANCE OF CONVERSION COATED PARTS

BACKGROUND OF THE INVENTION

The present invention relates to a coating composition and process for protecting small metallic parts from corrosion. More specifically, the present invention relates to an aqueous based organic rust preventative coating composition and process for protecting conversion coated steel fasteners or other small conversion coated steel parts.

Steel fasteners and other small steel parts are often employed in an environment which is conducive to corrosion, typically red rust. Rust is not only unsightly but it prevents good adhesion of paint or other coatings. Furthermore, rust will eventually destroy the steel fastener or part. In the case of fasteners which are employed to hold together portions of automotive vehicles or other products, it is particularly important to minimize their susceptibility to rust. The need for protecting steel surfaces from rust is, of course, well known and has been the subject of a considerable amount of research and development.

A conventional technique for protecting steel surfaces from rust involves contacting the steel surface with a solution containing phosphate ions to form a corrosion resistant, nonreactive phosphate complex coating on the steel surface. The steel surface is thus converted from a chemically active surface readily susceptible to oxidation and the coating thereon is known in the art as a "conversion coating." Following the application of a conversion coating to the steel surface, an after-treatment can be employed to further enhance corrosion resistance. Treatment with a dilute aqueous acidic solution of a chromium compound is a well known after-treatment. Still further rust prevention can be obtained by application of an organic top coat to the steel surface.

The present invention relates to a coating composition and process which provide excellent rust prevention to conversion-coated steel fasteners or other small conversion-coated steel parts when applied thereto. The composition of the present invention is an aqueous based composition, thus, avoiding the disadvantages associated with solvent based composition. In addition, the present composition enjoys good shelf-life, i.e. stability under conditions of normal storage, transportation and use. The composition and process of the present invention are particularly well adapted and effective to provide a rust preventative coating on fasteners and the like which are subjected to mechanical force such as threading during use.

Further understanding of the present invention will be had from the following disclosure wherein all parts and percentages are by weight unless otherwise indicated.

SUMMARY OF THE INVENTION

The present invention relates to an aqueous based coating composition comprising:
(A) a water solubilized adduct of an epoxy compound and an amino-substituted aromatic carboxylic acid;
(B) a curing agent;
(C) a flow control agent; and
(D) water.

Preferably, the amino-substituted aromatic carboxylic acid is para-aminobenzoic acid and the composition comprises from about 5% to about 41% non-volatile components.

In accordance with the process of the present invention, the coating composition is applied to a fastener or other small steel part having a conversion coated surface by a dip-spin-bake process to provide a cured water-borne coating of the present invention thereon.

DESCRIPTION OF THE INVENTION

An aqueous based coating composition of the present invention comprises a water solubilized epoxy adduct, a curing agent a flow control agent and water. In accordance with the process of the present invention, the coating composition is applied to a steel fastener part or other small steel part having a conversion coated surface by dipping the steel part into a bath of the coating composition, spinning excess coating composition off the part, dipping the part again into a bath of the coating composition, spinning excess coating composition off the part, baking the part to cure the coating thereon, and then cooling and lubricating the coated part with oil.

It has been found that the coating composition and its process of application are well adapted for use in coating conversion coated steel parts such as fasteners, e.g. threaded bolts or screws, washers, clips, brackets, springs, or other relatively small steel forms or parts. The coating composition applied to such parts in accordance with the present invention provides excellent corrosion or rust resistant properties to the parts despite flexing or mechanical force applied thereto. Thus, a bolt or screw which has been coated in accordance with the present invention has excellent corrosion resistance even after being threaded in place. It has also been found that a coating composition of the present invention, applied to a threaded fastener in accordance with the process of the present invention, does not unduly interfere with or clog the threads thereof. Furthermore, the coating composition is a water borne material avoiding the use of hard to handle solvents yet having good stability and hence, a practical shelf life.

It is contemplated that the composition of this invention will be applied to a steel fastener or other small steel part which has been previously subjected to a conversion coating step to form an inorganic coating thereon. Typical conversion coating processes are well known and have been described, for example, in *Metal Handbook*, Volume 2, Eighth Edition, pp. 529–547 of the American Society for Metals and in *Metal Finishing Guidebook and Directory*, pp. 590–603 (1972), the contents of both of which are specifically incorporated herein by reference. After the steel part has been subjected to the conversion coating step, the coating composition of the present invention is employed to provide an organic coating over the inorganic conversion coating.

The coating composition for use herein preferably comprises from about 5% to about 41% nonvolatile ingredients in an aqueous medium and, generally speaking, comprises a water solubilized epoxy adduct, a water soluble curing agent, a flow control agent, and water. The water solubilized epoxy adduct is an adduct of an epoxy compound and an amino-substituted aromatic carboxylic acid. The coating composition is applied to a conversion-coated steel fastener or other small part and then heated to provide a cured solid coating thereon.

Suitable water soluble, epoxy adducts for use herein are disclosed in U.S. Pat. No. 4,094,844, "Water-Borne Epoxy Resin Coating Compositions," which issued June 13, 1978, to Allen et al.; No. 4,098,744, "Curable Water-Borne Epoxy Resin Coating Compositions," which issued July 4, 1978, to Allen et al.; and 4,119,609, "Curable Epoxy-Carboxylic Acid Adducts," which issued Oct. 10, 1978, to Allen et al., which patents are specifically incorporated by reference herein.

In short, the water soluble, epoxy adduct of the present invention is the reaction product of an epoxy compound with an amino-substituted aromatic carboxylic acid. The reaction is conducted in a water soluble solvent such as propoxypropanol, butoxyethanol, ethoxyethanol, or combinations thereof. A preferred solvent is propoxypropanol. For example a preferred resin for use herein can be made by reacting a resin such as Epon 1002 (available from Shell Chemical Co.) through its oxiranes with the primary amine of PABA, para-aminobenzoic acid, to provide a polytertiary amine adduct containing pendent and terminal carboxylic acids.

Preferred epoxy compounds for use in the present invention have a weight per epoxy (equivalent weight per oxirane) of from about 450 to about 800 and preferably from about 600 to about 700 and are reacted with PABA with the fraction of PABA in the PABA-adduct being from about 9.5% to about 13.5%, (on a weight % basis) and preferably from about 10.0% to about 10.4%. This should provide about 1.0 to 1.06 equivalents of amine hydrogen in the PABA per equivalent of oxirane in the epoxy. The adduct should have an acid number of from about 27 to about 53, and preferably from about 33 to about 39. The coating composition can comprise from about 4% to about 40% of epoxy adduct but preferably the composition comprises from about 15% to about 33% of adduct.

The acid groups of the adduct are neutralized with a volatile base, preferably a volatile amine to water solubilize the epoxy adduct then a curing agent or cross-linking agent such as a melamine-formaldehyde type resin is added to the composition. Preferably, the cross-linking or curing agent employed is hexamethoxymethyl melamine which is commercially available from American Cyanamid Co. as CYMEL 303. Other suitable cross-linking agents are disclosed in the above referenced patents. An effective amount of curing agent is generally from 8 to 80 parts per 100 parts adduct.

In addition to the water solubilized epoxy adduct and curing agent, the coating composition of the present invention comprises a flow control agent. It is believed that the flow control agent improves the consistency of the coating on the steel part and, in some cases, may contribute to the lubricity of the coating. Generally, the composition can comprise from about 0.02% to about 3% of flow control agent. Suitable flow control agents include surfactants including fluorocarbons, silicones, nonionic and anionic wetting agents, ethoxylated alkylated phenols and derivatives thereof. Silicones are preferred because they contribute lubricity properties as well as flow control to the composition. Preferably, a combination of silicone, fluorocarbon and nonionic surfactant flow control agents is employed. Specific examples of suitable flow control agents include silicones such as Byk-301 available from Byk-Mallinckrodt, and MR-216 available from Hodag Corp., fluorinated alkylpoly(oxyethylene) ethanols, e.g. Flurad FC-171 from 3M Co. and other fluorocarbons, e.g., ammonium perfluoralkyl sulfonates, e.g. Flurad FC-93 from 3M Co., and perfluoroalkyl derivatives, e.g. Zonyl FSN or FSP from DuPont Corp., fluorinated alkyl esters, e.g. FC430 from the 3M Co., silicone fluids, e.g. modified polysiloxanes such as Additives #14, #15, or #21 from Dow Corning Corp. and Perenol S-5 from Henkel, Inc., and nonionic surfactants such as nonylphenoxypoly(ethyleneoxy) ethanol (66 weight percent ethylene oxide), e.g. Igepal CO-630 available from the GAF Corporation.

In addition to the above components, a preferred coating composition of the present invention comprises optional ingredients such as a slip agent for additional lubricity of the coating and a pigment to provide color. Also, extender pigments can be employed herein. Pigments suitable for use herein include carbon black dispersions, e.g. Tint Ayd WD-2350 from Daniels Products Co., lampblack, e.g. Hydrocol Black 9200 from Ciba Geigy, titanium dioxide, phthalocyanine blue, and red iron oxide. Slip agents suitable for use herein are well known in the art and can be employed in an amount of from about 0.05% to about 6% of the composition, preferably from about 0.05% to about 2%. Suitable slip agents include silicone resins, waxes, polyethylene and water dispersed hydrocarbons or oils. Examples of specific slip agents for use herein are Slip Ayd SL-295A and Slip Ayd SL-18 from Daniel Products Company, which are a dispersion of polyethylene in aqueous butoxy ethanol.

Of course, still other additional optional ingredients can be employed herein. For example, the coating composition can be blended with other compatible water dispersible film forming resins, for example: aqueous polyurethane resin solution, e.g., "Neo Res R-960," Polyvinyl Chemical Industries, Inc., or aqueous acrylic resin dispersion, e.g. Rohm & Hass, "Rhoplex MV-9."

As will be appreciated by those skilled in the art, generally speaking, the process of the present invention involves applying the coating composition of the present invention to a part to provide a coating thereon and then baking the coated part to cure the coating on the part. More specifically, the process of applying the coating of the present invention can be carried out in accordance with the following steps.

First, a conversion coated steel fastener or other small part is dipped into a bath of the coating composition. It is contemplated that this step will be carried out by, for example, providing a basket of parts and dipping the basket into the bath. The bath can be at room or elevated temperature.

Second, upon removal of the part from the bath it is subjected to centrifugal force such as by spinning in a centrifuge to remove excess coating thereon. Spinning for from about one to five minutes is sufficient to accomplish removal of excess coating.

Third, optionally, the part can be subjected to a prebake step. A suitable optional prebake step can be carried out by baking the part at about 210° F. for about 10 minutes.

Then, after separating any parts which might be sticking together, or to the container if a bracket of parts is employed, the part is subjected to a second dip into the coating bath, a second spinning step, and optionally a second prebake step, each carried out in accordance with the above three steps.

Finally, the part is subjected to a curing bake to effect a cure of the coating thereon. A suitable curing bake involves baking the part at about 180° C. for 30 minutes. Of course, somewhat higher or lower temperatures can be employed with a suitable adjustment of the time of baking, for example, a curing bake of about 155° C. for 60 minutes is suitable for use herein.

After cooling the part, it is then lubricated by, for example, dipping it into an emulsified, rust inhibitive oil such as Parcolac ®2945 from Oxy Metal Ind.

Further understanding of the present invention will be obtained from the following example.

EXAMPLE I

Into a reactor whose temperature is set to control at 117° C. and which was equipped with stirrer, nitrogen sprage, condenser, and temperature control, the following ingredients are charged:

| Ingredient | Parts by Weight |
|---|---|
| Propasol - P (2-Propoxy-2-propanol) from Union Carbide Corporation | 85.8 |
| Epon 1002 (Condensation polymer of bisphenol-A and diglycidyl ether of bisphenol-A; weight per oxirane about 650, range 600–700) from Shell Chemical Co. | 200.2 |

While heating, the resin dissolves at about 90° C. Then, 22.6 parts of para-aminobenzoic acid (from the Leeland Chemical Co.) is added and it too dissolves while heating. The acid number AN is about 41. Then the temperature of the reactor is maintained, i.e. controlled between 115° to 119° C. for seven hours. The reaction to form the adduct is now completed. The adduct's acid number is decreased to about 39 indicating that about 5% of the originally present carboxylic acid groups are consumed during the reaction by, for example, reaction with pendent hydroxyls and oxiranes of the epoxy resin. Next, the adduct solution is cooled to about 96° C., whereupon 18.7 parts of an 80% aqueous solution of 2-dimethylamino-2-methyl-1-propanol (from AMC Corp.) is added to neutralize about 81% of the carboxylic acid groups. Then, about 70.3 parts of hexamethoxymethylmelamine, having an equivalent weight about 66 and a degree of alkylation about 0.95, (Cymel 303 from American Cyanamid Co.) is added to the reactor. The temperature is maintained between about 78° C. to 92° C., while slowly adding 312.5 parts of water which has been preheated to about 95° C. The hot water is added over the course of about 30 minutes. Then the reactor is cooled towards room temperature and the following surfactants are added:

| Ingredient | Parts by Weight |
|---|---|
| Silicone, cross-linkable reactive resin, 50% active in butoxyethanol. (Byk-301 from Byk-Mallincrodt) | 1.9 |
| Nonylphenoxypoly(ethyleneoxy) ethanol, 66 weight % ethyleneoxide, (Igepal CO-630 from GAF Corp.) | 1.9 |
| Nonionic fluorinated alkylester surfactant (Fluoraid FC-430 from 3M Co.) | 1.9 |

Two hundred and eight parts of warm water at about 50° C. are added over a 30 minute period. When most of the water had been added, 41.7 parts of an aqueous disposition of carbon black pigment (Tint-Ayd WD 2350 from Daniel Products Co.) is charged. Finally, 34.2 parts of a dispersion of 21% polyethylene in aqueous butoxyethanol (Slip Ayd SL-295A from Daniel Products Co.) is added when the temperature had dropped to below 130° F. Total elapsed time is about 11.5 hours. After allowing the reactor vessel to cool overnight, the product is discharged through a coarse filter and stored. Some coagulated resin is found and discarded.

This product has the following physical characteristics:

| | |
|---|---|
| Acid Number of Neat Resin | 39 |
| Degree of Neutralization, calculated | 81% |
| pH (diluted to 2% NV) | 9.1 |
| Percent Resins | 29.3% |
| Percent All Non-Volatiles | 32.0% |
| Density (24° C.) | 1.069 |
| Viscosity, Zahn #2 Cup, (24° C.) | 22 Seconds |

The product is applied to zinc phosphated bolts by the following process. A basket containing the phosphated fasteners is dipped into a bath containing the product. Then the basket is removed and the fasteners are centrifuged for from one to five minutes to spin off excess coating. Next, the fasteners are prebaked at 210° F. for 10 minutes. Then the fasteners are separated to insure that none are sticking to each other or to the basket and then the basket containing the fasteners is again dipped into the product, removed, centrifuged, and prebaked as above. Finally, the fasteners are subjected to a curing bake at 350° F. for 30 minutes, cooled and lubricated by dipping into an emulsified, rust-inhibitive oil, Parcolac ® 2945.

The coated fasteners are then tested for corrosion resistance. First, the bolts are washed and allowed to dry. The bolts are then driven into a tapped fixture using a calibrated torque wrench according to the diameter of the threads:

¼ inch–Torque 4.5 to 7 Newton-Meters
5/16 inch–Torque 20 to 30 Newton-Meters
⅜ inch–Torque 26 to 40 Newton-Meters
10 mm.–Torque 40 to 54 Newton-Meters
12 mm.–Torque about 58 Newton-Meters.

The bolts are then mounted in a fixture and subjected to salt fog for 240 hours as described by ASTM B-117-78. The head, shoulder and washer areas of the bolts are then examined for visible rust. Little or no rust is observed, indicated that the bolts have excellent resistance to rust.

What is claimed is:

1. A process for improving corrosion resistance of conversion coated parts such as fasteners and the like comprising:
   (A) first dipping said conversion coated parts into a bath of an aqueous based coating composition comprising:
   (1) from about 4% to about 40% of a water solubilized epoxy adduct of an epoxy compound and an amino-substituted aromatic carboxylic acid;
   (2) a curing agent in an amount effective to cure said epoxy adduct;
   (3) from about 0.02% to about 3% of a flow control agent selected from the group consisting of silicones, fluorocarbons, nonionic wetting agents, anionic wetting agents, ethoxylated alkylated phenols and mixtures thereof; and (4) balance water;

(B) spinning said parts to remove excess coating composition;

(C) again carrying out step (A);

(D) again carrying out step (B);

(E) baking said parts to provide a cured coating composition thereon; and (F) applying an oil to said cured coating composition.

2. The process of claim 1 wherein said parts are subjected to a prebake step after step (B).

3. The process of claim 2 wherein said parts are subjected to a prebake step after step (D).

4. The process of claim 3 wherein step (E) is carried out by heating said parts in an environment of from about 310° F. to about 350° F.

5. The process of claim 4 wherein said composition comprises, in addition, from about 0.05% to about 6% of a slip agent.

6. The process of claim 5 wherein said composition comprises, in addition, a pigment.

7. The process of claim 6 wherein said amino-substituted aromatic carboxylic acid is paraaminobenzoic acid.

8. The process of claim 7 wherein said curing agent is hexamethoxymethylmelamine.

9. The process of claim 8 wherein said composition comprises from about 5% to about 41% nonvolatiles.

10. The process of claim 9 wherein said composition comprises from about 15% to about 33% of said adduct.

11. The process of claim 10 wherein said flow control agent is a silicone.

12. The process of claim 11 wherein said slip agent is an aqueous dispersion of polyethylene.

* * * * *